T. G. MELISH.
HOLDER FOR JARS.
APPLICATION FILED MAY 3, 1919.

1,421,705.

Patented July 4, 1922.

Inventor:
Thomas G. Melish,
By Arthur H. Ewald,
Attorney.

UNITED STATES PATENT OFFICE.

THOMAS G. MELISH, OF CINCINNATI, OHIO.

HOLDER FOR JARS.

1,421,705. Specification of Letters Patent. Patented July 4, 1922.

Application filed May 3, 1919. Serial No. 294,440.

*To all whom it may concern:*

Be it known that I, THOMAS G. MELISH, a citizen of the United States, a resident of Cincinnati, in the county of Hamilton and State of Ohio, have invented certain new and useful Improvements in Holders for Jars, of which the following is a full, clear, and exact description, reference being had to the accompanying drawings, forming a part of this specification.

The present invention relates to holders for jars during the preserving of fruits, vegetables and the like. It has become a common practice to preserve fruits and vegetables by placing the same in jars in a raw state and then placing the jars in a vessel containing boiling water. In order that the jars may be properly handled during this process a holder or frame is ordinarily provided. The present invention has for its principal object the provision of a device of this character whereby a plurality of jars may be simultaneously handled, and in which provision is made for spacing the jars so that the same will not contact during the process, thus preventing injury to the jars.

A further object of this invention is to provide in a holder for a plurality of jars, adjustable spacing members so that provision may be made for jars of varying sizes and in varying numbers.

Another object of the invention is to provide a holder for jars of the character mentioned, the same being collapsible for transportation and storage purposes.

A still further object of this invention is to provide locking means in a holder of the character mentioned, whereby the device may be locked in open position during use, thus preventing it from collapsing when not desired.

Other objects of the present invention will appear from the following description thereof, taken in connection with the accompanying drawings.

In the drawings:—

Figure 1:
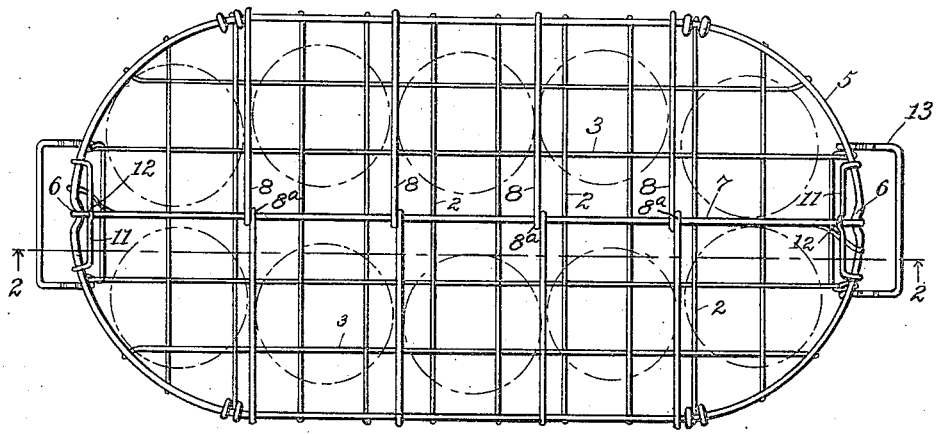
Figure 1 is a plan view of a holder constructed in accordance with the present invention, the same being in open position, a number of jars being illustrated therein in broken lines.

The numeral 1 indicates a bottom frame, which in the form illustrated is provided with rounded ends, but which may be of any other preferred shape. The frame 1 is provided with cross wires 2 and longitudinal wires 3, the same being woven together, and together forming a bottom or base member for the holder. The wires 2 and 3 are undulated, as shown, to give added rigidity to the base. The wire frame 1 is also bent to form foot members 4, suitably disposed to give proper stability to the device.

The numeral 5 indicates a wire frame corresponding in shape to the frame 1. The ends of the frame 5 are slightly indented, as shown at 6—6, and the ends of a longitudinal wire 7 are secured in said indentations. The wire 7 is thus prevented from becoming dislocated upon the frame. Cross wires 8 in any suitable number are adjustably mounted upon the frame 5 and longitudinal wire 7, each of the wires 8 being provided with eyes at its end and middle loosely to engage the sides of the frame 5 and the wire 7. The wires 8 may thus be moved longitudinally upon the frame 5 for adjustment purposes.

The frames 1 and 5 are collapsibly secured together by means of double wires 9 secured at suitable intervals to the frames, the wires 9 being hinged to the two frames by means of eyes which engage the respective frames. Pivotally secured to each end of the frame 1 are the ends of a wire 10, each of which wires is provided with an upper hook section 11 for engaging the end of frame 5. The section 11 is provided with a raised portion 12, which permits it to engage the longitudinal wire 7 on the frame 5, and the wire 10 thus serves to lock the frame 5 against lateral movement upon the hinge wires 9.

Also pivotally secured to the ends of the bottom frame 1 are handles 13 provided with hooks 14, by means of which hooks the device may be supported upon the rim of an ordinary wash boiler during the preserving process.

Figure 2:
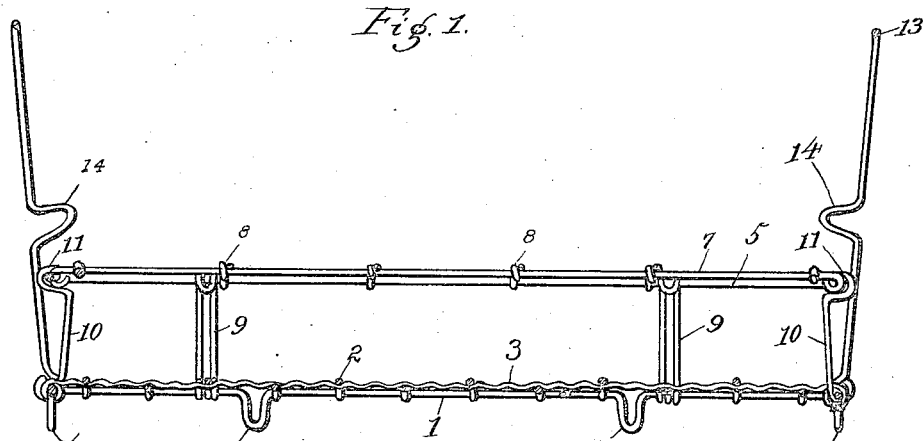
Figure 2 is a section or line 2—2 of Figure 1.
Figure 4:
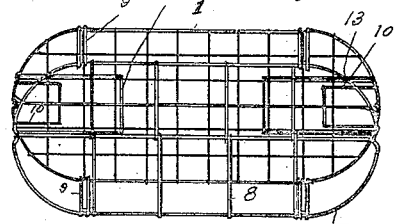
Figure 4 is a plan view of the holder in a collapsed or closed position for transportation or storage.
Figure 3:
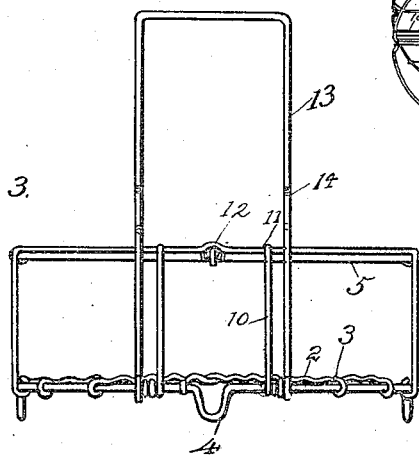
Figure 3 is an end elevation of the same.

The use and operation of the device will be apparent from the foregoing description thereof. The bottom frame 1 and woven wires 2 and 3 provide a substantial and rigid base for jars placed thereon. The frame 5 being locked in raised or open position, as illustrated in Figures 2 and 3, the wires 8 may be moved longitudinally to accommodate jars of the required size and number. The holder containing the jars may then be placed in the boiler in the usual manner. When the holder is not in use the same may be collapsed or closed by disengaging the hook sections 11 of wires 10 from the frame 5. The frame 5 may then be moved laterally upon the hinge wires 9 until it rests upon the frame 1. The handles 13 and hook wires 10 are then brought against the underside of the bottom frame, when, as will be seen, the device is in a very compact condition, suitable either for transportation or storage.

Having thus fully described my invention what I claim as new, and desire to secure by Letters Patent is:—

1. In a holder for jars the combination with a bottom frame and an upper frame collapsibly secured together and a wire secured in said upper frame at the ends thereof, of a wire at each end of said bottom frame and pivotally secured thereto, said wires being provided with hooks to engage the wire in said upper frame to lock the frames in open position.

2. In a holder for jars the combination with a bottom frame and an upper frame collapsibly secured together and a wire secured in said upper frame at the ends thereof, of a wire at each end of said bottom frame and pivotally secured thereto, said wires being provided with hooks to engage the wire in said upper frame to lock the frames in open position, and spacers adjustably secured in said upper frame.

3. In a holder for jars the combination with a bottom frame and an upper frame collapsibly secured together and a wire secured in said upper frame at the ends thereof, of a wire at each end of said bottom frame and pivotally secured thereto, said wires being provided with hooks to engage the wire in said upper frame to lock the frames in open position, and handles pivotally secured to one of said frames.

THOMAS G. MELISH.